Oct. 15, 1940.  F. H. EHNTS  2,217,738
LUBRICATING FITTING
Filed July 30, 1938
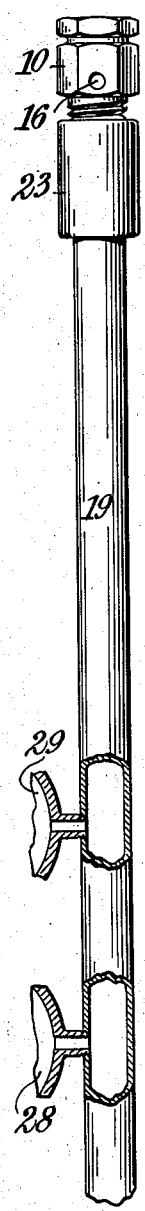
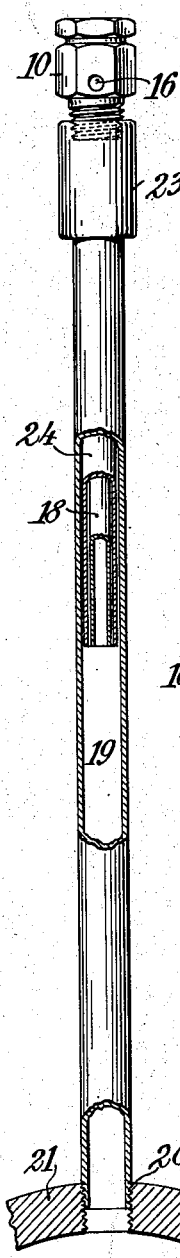
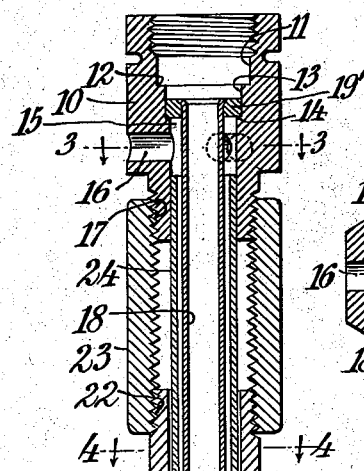
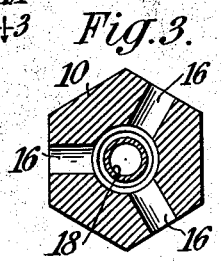
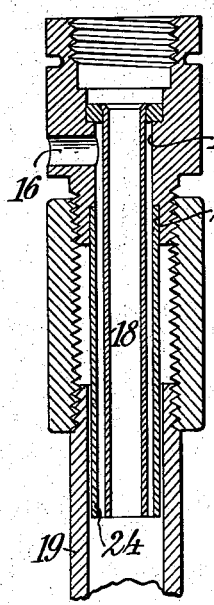
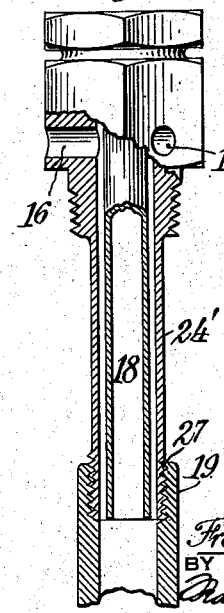
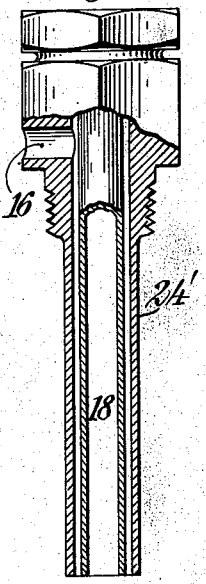
INVENTOR
Fred Henry Ehnts,
BY
ATTORNEYS.

Patented Oct. 15, 1940

2,217,738

UNITED STATES PATENT OFFICE 2,217,738

LUBRICATING FITTING

Fred Henry Ehnts, Lansdowne, Pa., assignor to Keystone Lubricating Company, Philadelphia, Pa., a corporation of Pennsylvania Application July 30, 1938, Serial No. 222,101

7 Claims. (Cl. 184—105)

My present invention relates to fittings for low pressure lubrication for ball and roller bearings, and aims to provide certain improvements therein. More particularly it relates to such fittings which provide a tell-tale or indication when the bearing being lubricated has been supplied with the requisite amount of grease. Furthermore, it constitutes an improvement over certain features of the invention disclosed in my co-pending application, Serial No. 203,011, filed April 20, 1938.

The practice heretofore conventionally followed in the lubrication of ball and roller bearings with grease has been to inject the grease under pressure into a bearing, either by means of a high pressure grease gun through a high pressure fitting, or by a hand compression cup. With either device the risk of under-lubrication is obvious. Even more serious, however, is the danger of over-lubrication, which results in power losses, overheating caused by internal friction, and excessive wear, the placing of undue stresses on the bearing races and the wasting of lubricant. Recognizing these inherent dangers, bearing manufacturers recommend that ball and roller bearings be charged no more than two thirds full of grease, and preferably only one third to one-half full.

Until quite recently no means were available for indicating when a bearing has been properly charged with viscous lubricant, and one had to trust to chance that enough, and not too much, grease had been supplied to a bearing. This was especially true where the bearings were located at inaccessible places, which necessitated the use of extension tubes leading from the bearings and through which the grease had to be supplied to the bearings.

My present invention has for its primary object the provision of a fitting which can be embodied in or used with an extension tube and thereby provide a tell-tale for insuring proper lubrication of bearings located at remote and inaccessible points. A further object is to provide a tell-tale fitting for lubricating a plurality of spaced apart bearings from a point remote from the bearings. A further object is to provide such fitting which will be simple in construction, with no parts subject to becoming dislocated in use, and hence foolproof in operation.

In my co-pending application above referred to I have shown and described a fitting intended to accomplish the stated object of the present invention, and although the fitting disclosed therein accomplished said objects to a certain degree I have discovered that, because of irregularities in the internal diameter and character of the bore of the extension pipes used (these usually being iron pipes), the results obtained, although constituting a marked and definite improvement over prior devices, nevertheless were not entirely uniform. To remedy this condition while at the same time provide fittings which can be mass produced with the assurance that results obtained therewith would be uniform, I provide the fitting with two substantially concentric tubes and rely upon the skin friction of the adjacent walls of these tubes for building up the necessary resistance to the back flow of grease from a bearing to the tell-tale opening in the fitting for indicating when the predetermined amount of grease or back pressure built up thereby has been obtained, instead of relying upon the uncertain internal diameter and wall condition of ordinary iron pipe conventionally used as extension members. The invention will be better understood from the detailed description which follows, when considered in conjunction with the accompanying drawing, wherein:

Figure 1 is a side elevation partly in section, of my invention applied to an extension tube connected to a bearing.

Fig. 2 is a diametrical section on an enlarged scale of a similar fitting intended for use with a shorter extension tube than shown in Fig. 1.

Fig. 3 is a section taken substantially along the plane of the line 3—3 of Fig. 2.

Fig. 4 is a section taken substantially along the plane of the line 4—4 of Fig. 2.

Fig. 5 is a view somewhat similar to Fig. 2 of a slightly modified form of construction.

Figs. 6 and 7 are diametrical sections showing still further modifications.

Fig. 8 shows an application of my invention to lubricating spaced apart bearings.

Referring first to Figs. 1 to 4 of the drawing, the fitting may be said to consist of a tubular casing 10, herein shown as being of hexagonal cross-section and having a bore therethrough of progressively increasing diameter from the top to the bottom thereof. The enlarged bore 11 at the top of the casing is internally screw-threaded and terminates in a shoulder 12 leading to a bore 13 terminating in a shoulder 14 and from there proceeding in further reduced uniform diameter 15 through the fitting. The casing 10 is formed with one or more lateral openings 16 therethrough leading from the bore 15 to the exterior of the casing, for a purpose which will be presently described. At its lower end the casing is somewhat reduced in diameter and externally screw-threaded, as indicated at 17.

Disposed within the casing and extending from a point above the shoulder 14 through the bottom of the casing is a tubular element 18 which may be held within the casing by being secured to a washer 19', which, in turn, may be force-fitted into the bore 13 to seat against the shoulder 14, or held within the casing in any desired manner. This tubular element 18 serves as the duct through which viscous lubricant which is received through the top of the casing from a suitable source (not shown) is supplied to a tubular extension member or pipe 19, one end 20 of which is connected or adapted for connection to a housing 21 of a bearing or other member to be lubricated. The opposite end 22 of the tubular extension member may be suitably connected to the casing 10 by a coupling sleeve 23. The construction thus far described is substantially similar to that disclosed in Figs. 5 and 6 of my co-pending application above referred to.

To insure and accurately control the back pressure at which viscous lubricant charged into the tubular extension member 19 when connected to a bearing housing 21 or the like, will back up and exude through the openings 16 leading from the chamber formed between the wall of the bore 15 and the outer wall of the tubular element 18, I provide a second tubular element 24 disposed in substantially concentric spaced relation to the tubular element 18, the said tubular elements 18 and 24 terminating flush at their lower ends. The cross-sectional area between the tubular elements 18 and 24 and the length of said elements are calibrated with respect to the length of the extension member with which they are used to provide the necessary resistance to the back flow of the lubricant to permit the lubricant to exude out of the openings 16 when the lubricant being charged into the bearing housing has built up the desired back pressure.

As shown in Fig. 2, the tubular element 24 is force-fitted or otherwise fixedly held within the bore 15 of the casing 10. In Fig. 5 I have shown the bore 15 at its lower end as being somewhat enlarged, as indicated at 25, and the tubular element 24 force-fitted into said enlarged portion so that the internal wall of the tubular element 24 is substantially flush with the bore 15. It will, of course, be understood that where this latter arrangement is resorted to, the cross-sectional area between the tubular elements 18 and 24 may be made the same as in Fig. 2, or if said area differs therefrom, the lengths of the tubes will be modified, as found necessary. If desired, instead of forming the tubular element 24 as a separate member and securing it to the casing 10, said casing may be formed with a tubular axial extension $24^x$ to engage within the tubular extension member 19, as shown in Fig. 6, or said extension member may be formed at its free end with screw-threads, as indicated at 27, for direct attachment to the end of the tubular extension member 19, as shown in Fig. 7. Obviously the axial tubular extension on the casing may be so dimensioned as to screw-threadedly engage either internal or external screw-threads on the extension member 19.

In the various embodiments of my invention shown, the degree to which the concentric tubular elements extend into the extension member will vary as the length of the extension member varies; and further, I have found that the ratio of increase in the lengths of the concentric tubular elements will be at a lesser rate than the ratio of the increase in length of the tubular extension member 19. The relative lengths of the tubular elements with respect to the extension members necessary to give the proper tell-tale indication when lubricating bearing housings can be empirically ascertained since these will differ depending upon the cross-sectional area between the concentric tubular elements.

In carrying out my invention it is preferable that the complemental surfaces of the tubular elements 18 and 24 or 24' be smooth so that the resistance offered thereby to the passage of the viscous lubricant between the tubular elements will be substantially constant under similar conditions and dimensions of tubular elements employed. In the use of my invention as hereinbefore described, the fittings, i. e., the casing 10 and the tubular elements 18 and 24 or 24', will be marked with numbers corresponding to the length in inches of the extension members with which they are to be used, and it will be merely necessary to attach a fitting provided with proper designation of extension tube length to such extension tube and apply the lubricant to the charging end thereof until the lubricant exudes or is discharged from the openings 16. It is preferable, however, to first remove the extension member from the bearing and to charge the lubricant therein through the charging end of the fitting, holding the finger over the discharge end of the extension member until the tell-tale discharge of lubricant through the openings 16 is obtained. The extension member is then screwed into the bearing and the charging of the bearing is proceeded with until the lubricant again issues forth from the openings 22 for at least a quarter of an inch, thereby giving an indication that the bearing is adequately lubricated.

The fitting described can also be used for lubricating a plurality of bearings at spaced apart points by calibrating the lengths of the cencentric tubular elements and the cross-sectional area between the walls thereof with respect to the location of the spaced bearings to be lubricated, as indicated in Fig. 8, wherein the spaced bearings to be lubricated are designated by the reference numerals 28 and 29.

From the foregoing detailed description it will be apparent that I have devised a simple, efficient and practical fitting for insuring proper lubrication of ball and roller bearings and bearings at spaced apart points; and for providing a visible tell-tale for indicating when the bearings have been adequately lubricated, and while I have shown and described certain preferred embodiments of my invention it is to be understood that I do not wish to be limited to the specific constructions disclosed since the same may be varied within the range of engineering skill without departing from the spirit of my invention.

What I claim is:

1. A lubricating fitting comprising a tubular casing having at its top means for engagement with a source of viscous lubricant, means below its top through which the casing is attachable to a member for receiving the lubricant upon discharge from the fitting, a tubular element disposed within the bore of said casing below the top thereof in spaced relation to the wall of said bore, said casing having an opening therein in proximity to the top of the casing providing open communication between the exterior of the casing and the space between the wall of the casing bore and the outer wall of the tubular element and said casing having a tubular axial extension encircling the tubular element in substantially concentric relation thereto of a length to extend a substantial distance from the opening in the casing, the various parts of the fitting being fixed relatively to one another in use.

2. A lubricating fitting according to claim 1, wherein the tubular axial extension terminates flush with the free end of the tubular element.

3. A lubricating fitting according to claim 1, wherein the means on the casing through which the casing is attachable to the member for receiving the lubricant is located adjacent the opening in the casing.

4. A lubricating fitting according to claim 1, wherein the means on the casing for attachment to the member for receiving the lubricant is located at the free end of the tubular axial extension.

5. A lubricating fitting according to claim 1, wherein the tubular axial extension on the casing is formed separately from the casing and held thereto by being force-fitted into the bore of the casing.

6. A lubricating fitting comprising a tubular casing having at its top means for engagement with a source of viscous lubricant, means below its top for attachment to a tubular extension member adapted for connection with a member for receiving the lubricant upon discharge from the tubular extension member, a tubular element disposed within the bore of said casing below the top thereof in spaced relation to the wall of said bore, said casing having an opening therein in proximity to the top of the casing providing open communication between the exterior of the casing and the space between the wall of the casing bore and the outer wall of the tubular element and said casing having a tubular axial extension in substantially concentric relation to the tubular element extending from a point within the casing below the opening therein, down into the tubular extension member.

7. A tell-tale lubricating fitting for indicating at a point remote from a bearing housing to be lubricated when said bearing housing has been properly lubricated, comprising a tubular extension member one end of which has means for attachment to a bearing housing for receiving viscous lubricant, two substantially concentric tubular elements within the tubular member, said concentric tubular elements each having one end spaced rearwardly of the discharge end of the tubular extension member and having the other end terminating in a casing having means for engagement with a source of viscous lubricant which is adapted to be discharged through the inner tubular element into the tubular extension member and from there into the bearing housing, said casing having an opening therein providing open communication between the exterior thereof and the space between the walls of the concentric tubular elements.

FRED HENRY EHNTS.